No. 869,170. PATENTED OCT. 22, 1907.
R. E. FOOTE.
SLED.
APPLICATION FILED DEC. 29, 1906.

2 SHEETS—SHEET 1.

Inventor
Robert E. Foote,

Witnesses
By Victor J. Evans
Attorney

No. 869,170. PATENTED OCT. 22, 1907.
R. E. FOOTE.
SLED.
APPLICATION FILED DEC. 29, 1906.
2 SHEETS—SHEET 2.
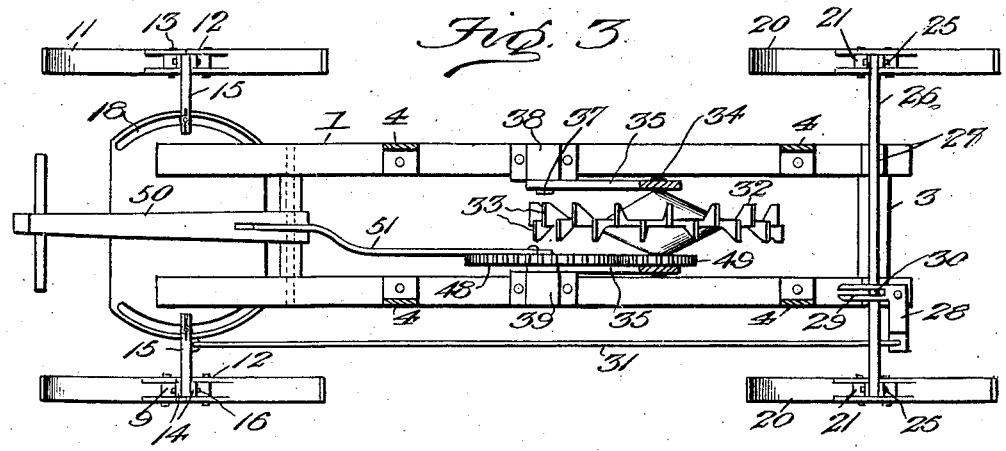
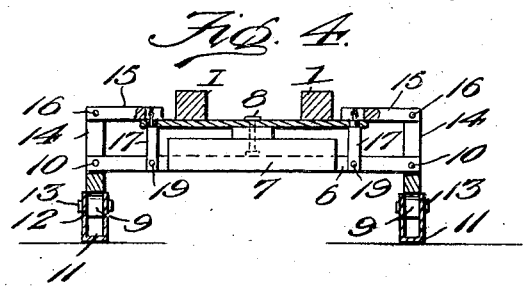
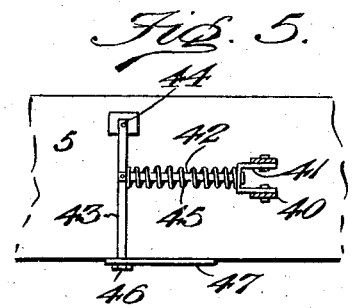
Inventor
Robert E. Foote,
Witnesses
By Victor J. Evans
Attorney

UNITED STATES PATENT OFFICE.

ROBERT E. FOOTE, OF HARVEY, ILLINOIS.

SLED.

No. 869,170.   Specification of Letters Patent.   Patented Oct. 22, 1907.

Application filed December 29, 1906. Serial No. 350,084.

*To all whom it may concern:*

Be it known that I, ROBERT E. FOOTE, a citizen of the United States of America, residing at Harvey, in the county of Cook and State of Illinois, have invented new and useful Improvements in Sleds, of which the following is a specification.

This invention relates to manually or motor-propelled sleds, one of its objects being to provide a sled in which the spurred propelling wheel is projected by spring pressure against the surface of the snow or ice so as to have a yielding movement for free passage over obstructions or irregularities of surface to prevent injury to the same or driving mechanism thereof, the construction being such as to regulate the spring pressure as desired and to throw the wheel out of operation to permit the sled to coast.

A further object of the invention is to provide means for conveniently turning the front steering runners to steer the sled, and means to incline all of the runners in making a turn so that the sled may be turned with facility and skidding prevented.

Figure 1:
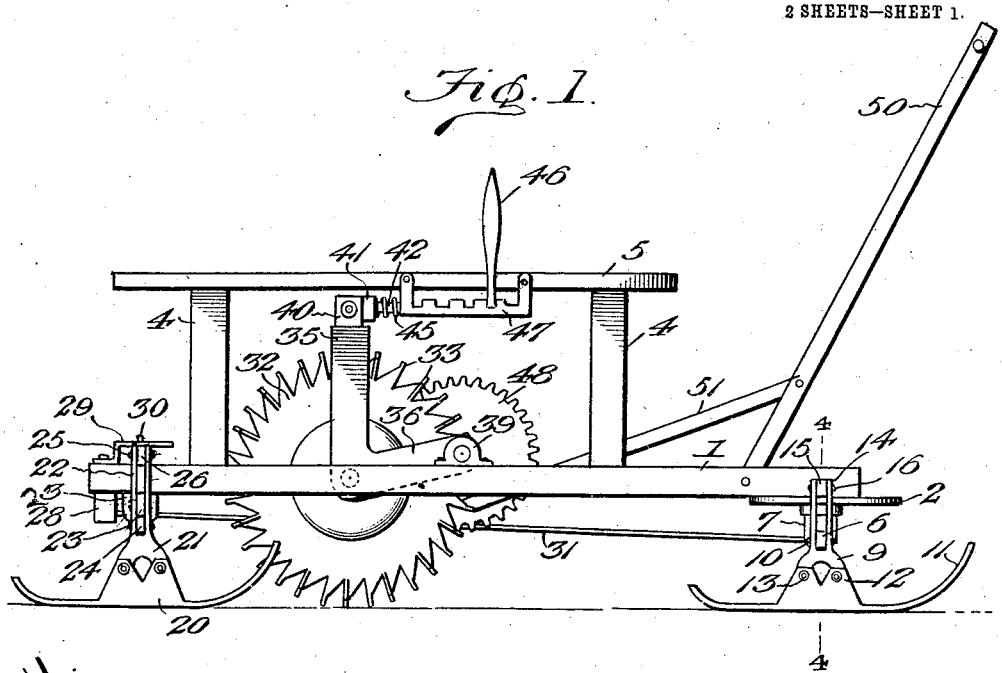
Figure 2:
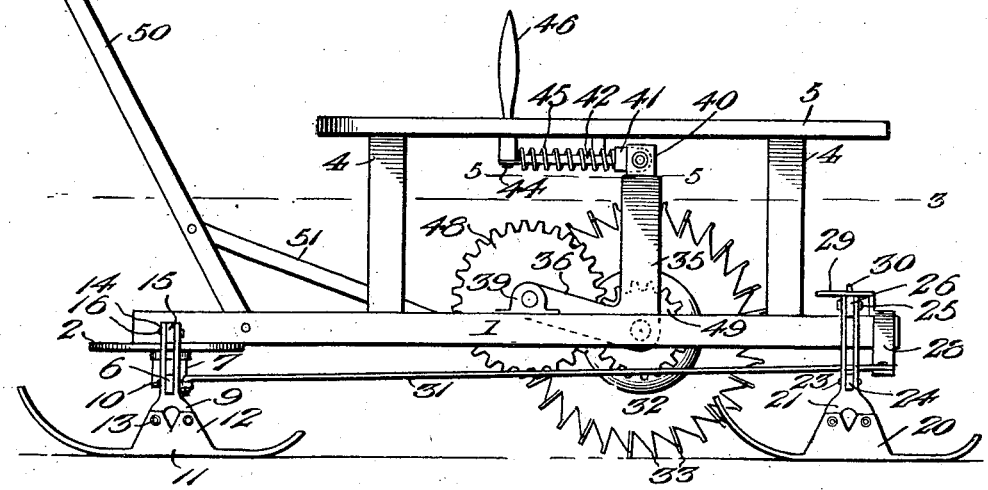

In the accompanying drawings,—Figure 1 is a side elevation of a sled constructed in accordance with my invention and as adapted to be manually propelled. Fig. 2 is an opposite side elevation of the same. Fig. 3 is a sectional plan view, the plane of section being denoted by the line 3—3 of Fig. 2. Fig. 4 is a transverse section through the frame and front runners and steering gear on the line 4—4 of Fig. 1. Fig. 5 is a detail section on line 5—5 of Fig. 2, looking upward to show the means for shifting the wheel supporting frame.

The frame of the sled may vary considerably in construction, but in the form shown comprises a pair of longitudinal side bars 1 secured to and connected at front by a stationary transverse plate 2, which extends at its ends beyond the bars and forms one of the members of a fifth wheel, the rear ends of the bars being connected by a transverse bar 3. U-shaped standards 4 rise from the side bars and support a seat board or platform 5.

An axle 6 is arranged below the forward ends of the bars 1 and the plate 2 and is provided with a central bolster 7 having a circular head adapted to turn in contact with the plate 2 and pivotally connected therewith by a king bolt 8, thus forming a fifth wheel connection on which the axle swings. Brackets 9 are pivotally mounted for lateral movement upon the ends of the axle by pins or bolts 10 and support front steering runners 11, having upwardly extending spaced attaching plates 12 detachably secured to the brackets by bolts 13, whereby runners of different construction may be applied for use on snow or ice. The brackets have upwardly extending arms 14 slotted to receive the ends of the axle and the outer ends of guide arms or levers 15, which levers are pivotally connected thereto by pins or bolts 15. The inner ends of the levers 15 are formed with downturned guide fingers 17 which project downwardly through and are fitted to slide freely in guide slots 18, which slots are of the cam type or curve on arcs slightly eccentric to the king bolt or axis of the axle 6. The fingers may have journaled thereon friction rollers to run in said slots, and their lower ends are pivotally connected with the axle by links 19. The slots 18 are so formed as to shift levers 15 inwardly or outwardly, accordingly as the axle is swung in one direction or the other, so that said levers will impart a lateral swinging movement to the steering runners to tilt or incline the same toward the side or in the direction in which the sled is making the turn, thus simulating the inclined steering action of skates to facilitate the turning of the sled and reduce liability of skidding to the minimum. The levers 15 are adapted to be engaged by the feet of the rider, whereby they may be shifted to swing the axle and steer the sled as desired.

The rear runners 20 are similar in construction to the front steering runners and are secured in the same manner to brackets 21 whose slotted arms 22 are pivoted by bolts 23 for lateral movement upon the ends of a stationary rear axle 24 secured to the rear cross piece or bolster 3. The upper ends of the arms of the two brackets 21 are pivotally attached by bolts 25 to a transverse connecting rod 26 arranged to slide in guides 27 on the rear ends of the bars 1. The rear runners are not designed to turn in the steering of the sled, but tilt similarly to the front steering runners for the purpose described. To this end, provision is made for transversely shifting the rod 26 to swing the runners 20 transversely to the desired inclination, such means comprising a bell crank lever 28 having a slotted arm 29 receiving and engaging a pin 30 on the rod 26, the other arm of said lever being coupled to the front axle by a connecting rod 31. When the front axle is turned in one direction or the other, the bell crank lever will be operated to slide the bar or rod 26 either to the right or left, whereby the rear runners will be inclined in an obvious manner.

A propelling wheel 32 is provided to propel the machine over the surface of the ice or snow. This wheel is formed or provided with peripheral spurs or teeth 33 of any preferred form and arrangement and is carried by a shaft 34 journaled at its ends in the side pieces of a vertically movable frame or yoke 35, which is preferably of inverted U-shape. The lower ends of the side pieces of this frame are provided with forwardly and upwardly extending oblique arms 36, one of which is pivoted on a shaft 37 journaled in a bearing 38 on one of the frame bars 1, the other arm being provided with a journal or trunnion turning in a bearing 39 on the other bar 1, whereby the frame is mounted to swing vertically to raise and lower the propelling wheel. Spaced ears or bracket pieces 40 are carried by the upper portion or cross piece of the frame 35, and to these ears is pivotally connected a U-shaped bracket 41 in which is slidably mounted one end of a bolt or rod 42, the other end of which is pivotally connected with a shifting lever 43 pivoted at one end to the underside of the seat board 5, as indicated at 44. A stout coiled spring 45 surrounds the rod or bolt between the lever and bracket 41 and exerts pressure thereon to normally force the wheel carrying frame 35 downwardly and rearwardly to throw the propelling wheel into operation. By means of the lever 43, which swings in a direction longitudinally of the seat board 5, the frame 35 may be adjusted to raise or lower the wheel, so that the spurs or teeth thereof may be embedded to a greater or less extent in the snow or ice to regulate the tractive power thereof, the pressure of the spring on the wheel thus being correspondingly regulated. The lever extends at one end beyond the seat board and is provided with an upright operating handle 46 and is adapted to interlock with a rack 47 having a plurality of teeth or notches, whereby the lever may be secured in a variety of different positions to hold the propelling wheel at different elevations. The wheel may thus be adjusted to suit different conditions of service and may be elevated entirely above the surface of the snow or ice to permit the sled to coast in making turns and descending grades, and as the bracket 41 is free to slide on the bolt against the resistance of the spring 45, it will be readily understood that the wheel is resiliently mounted to pass over obstructions and irregularities of surface without injury.

The shaft 37 carries a crank gear 48 meshing with a pinion 49 on the shaft of the propelling wheel, whereby the latter may be driven. Motor mechanism of any preferred kind may be employed to drive this gearing, but in the present instance I have shown the sled as adapted for manual propulsion. An oscillating hand lever 50 is mounted upon the front portion of the frame so as to be conveniently operated by the rider and is connected with the crank of the gear 48 by a pitman rod 51, whereby on oscillating the lever the gearing will be driven.

From the foregoing description, taken in connection with the drawings, the construction and mode of operation of my improved sled will be readily understood without further description, and the advantages of the improved features of construction will be appreciated.

Having thus described the invention, what is claimed as new, is:—

1. In a sled, the combination of a main frame provided with runners, a propelling wheel, a vertically movable swinging frame carrying the propelling wheel, an adjusting lever for raising and lowering the swinging frame, a rod or bolt pivoted to the lever and slidably and pivotally connected with the swinging frame, a spring surrounding the bolt and exerting pressure on the swinging frame, and means for locking the lever in a variety of adjusted positions.

2. In a sled, the combination of a frame, tilting runners at the rear of the frame, a swinging axle at the front of the frame, tilting steering runners carried by the axle, means for tilting said steering runners as the axle swings, and a connection between the front axle and rear tilting runners to effect the tilting of the latter.

3. In a sled, the combination of a frame, tilting runners at the rear of the frame, a swinging axle at the front of the frame, levers for swinging the axle, said levers being pivotally connected with said axle, front steering runners pivotally connected with the axle and levers, guiding means for the levers for tilting said steering runners as the axle swings, and means for imparting motion from the front axle to the rear tilting runners to effect the tilting of the latter.

4. In a sled, the combination of a frame having cam slots at the front thereof, tilting runners at the rear of the frame, a swinging axle at the front of the frame to the axis of which the slots are eccentrically arranged, steering runners pivotally mounted on the axle, steering levers pivotally connected with the runners and having portions sliding in said slots, whereby the levers when moved to turn the axle will be shifted to tilt said steering runners, and connections between the front axle and rear runners to tilt the latter with the steering runners.

5. In a sled, the combination of a frame, a front axle carrying tilting runners, means for swinging said axle and simultaneously tilting the runners, tilting rear runners, a sliding rod connecting the rear runners, a bell crank lever operatively connected with said rod to shift the same, and an operating connection between said lever and the front axle.

6. In a sled, the combination of a main frame provided with runners, a propelling wheel, a swinging yoke carrying the propelling wheel, said yoke having its cross bar upwardly disposed, a lever arranged to swing longitudinally of the frame, a rod or bolt pivotally connected with the lever and slidably and pivotally connected with the head of the yoke, a spring surrounding the bolt and exerting pressure on the swinging frame for tilting the latter downwardly, and means for locking the lever in a variety of adjusted positions.

7. In a sled, the combination of a main frame provided with runners, a propelling wheel, a vertically swinging yoke-shaped frame having its cross bar upwardly disposed, said frame being provided with angular arms pivoted upon the main frame, an adjusting lever movable longitudinally of the main frame for raising and lowering the swinging frame, a rod or bolt pivoted to the lever and slidably and pivotally connected with the head of the swinging frame, a spring surrounding the bolt and exerting pressure on the swinging frame to force the same downwardly and rearwardly, and means for locking the adjusting lever in a variety of positions.

8. In a sled, the combination of a main frame provided with runners, a propelling wheel, a yoke-shaped frame carrying said propelling wheel, said frame having its head portion or cross bar upwardly disposed and being provided at its lower end with forwardly projecting arms pivoted on the main frame, an adjusting lever arranged to swing longitudinally of the main frame for raising and lowering the swinging frame, a rod or bolt pivoted to the lever and slidably and pivotally connected with the swinging frame, a spring surrounding the bolt and exerting pressure on the swinging frame to force the latter downwardly and rearwardly, and means for locking the lever in a variety of adjusted positions.

9. A sled provided with front and rear sets of laterally tilting runners, swinging means for tilting the front set of runners, sliding means for tilting the rear set of runners, and an operative connection between said swinging and sliding means.

10. A sled provided with front and rear sets of laterally tilting runners, swinging means for tilting the front set of runners, guiding means associated with said swinging means for moving the front runners in a determined path, sliding means for tilting the rear set of runners, and an operative connection between said swinging tilting means and the sliding tilting means, whereby the sets of runners are adapted to be tilted in unison.

11. A sled provided with front and rear sets of laterally tilting runners, swinging means for tilting the front set of runners, sliding means for tilting the rear set of runners, a bell crank lever for operating the sliding means, and a connecting rod between said swinging means and bell crank lever, whereby the two sets of runners are adapted to be tilted in unison.

In testimony whereof, I affix my signature in presence of two witnesses.

ROBERT E. FOOTE.

Witnesses:
J. C. GORMEN,
C. H. APPLEGATE.